(12) United States Patent
Hood, III et al.

(10) Patent No.: US 8,079,852 B2
(45) Date of Patent: *Dec. 20, 2011

(54) GROUNDED POWER ADAPTER

(75) Inventors: Charles D. Hood, III, Cedar Park, TX (US); Donald L. Wallace, Temple, TX (US); Christopher A. Torres, San Marcos, TX (US)

(73) Assignee: Dell Products L.P., Round Rock, TX (US)

( * ) Notice: Subject to any disclaimer, the term of this patent is extended or adjusted under 35 U.S.C. 154(b) by 11 days.

This patent is subject to a terminal disclaimer.

(21) Appl. No.: 12/943,494

(22) Filed: Nov. 10, 2010

(65) Prior Publication Data

US 2011/0053394 A1    Mar. 3, 2011

Related U.S. Application Data

(63) Continuation of application No. 12/333,832, filed on Dec. 12, 2008, now Pat. No. 7,854,617.

(51) Int. Cl.
*H01R 13/648* (2006.01)
(52) U.S. Cl. ........................ 439/105; 439/628
(58) Field of Classification Search .............. 439/628, 439/95, 101, 105, 108; 320/111; 361/93.1; 363/146
See application file for complete search history.

(56) References Cited

U.S. PATENT DOCUMENTS

| 5,648,712 | A | 7/1997 | Hahn |
| 2004/0018774 | A1 | 1/2004 | Long et al. |
| 2007/0059977 | A1 | 3/2007 | Asante et al. |

OTHER PUBLICATIONS

65W Apple Mac G4 IBook Power Book A1012 AC Power Adapter: http://www.televates.com HM/0717/65WAppleMacGiBookPowerBookA1012ACPower . . . ; 1 page.
http://jadescomputer.com/images/jc_apple65WF.jpg; 1 page.
Non-Final Action issued May 21, 2010 by United States Patent and Trademark Office in U.S. Appl. No. 12/333,832, 9 pages.

*Primary Examiner* — Vanessa Girardi
(74) *Attorney, Agent, or Firm* — Haynes and Boone, LLP

(57) ABSTRACT

A power adapter includes an adapter base defining a plug member channel immediately adjacent a first channel wall and a second channel wall that is oriented substantially perpendicular to the first channel wall. A power member connector extends into the first channel wall such that no part of the power member connector protrudes into the defined plug member channel. A ground member connector is located on the second channel wall and spaced apart from the power member channel. A plug member includes a plug base having a first plug wall and a second plug wall that is oriented substantially perpendicularly to the first plug wall. A power member is located on the first plug wall and a ground member is located on the second plug wall. The plug member is operable to be inserted into the plug member channel such that the power member enters the power member channel and electrically couples to the power member connector and the ground member engages the ground member connector.

20 Claims, 19 Drawing Sheets

GROUNDED POWER ADAPTER

The present application is a Continuation of co-pending U.S. patent application Ser. No. 12/333,832, filed on Dec. 12, 2008, the disclosure of which is incorporated herein by reference.

BACKGROUND

The present disclosure relates generally to information handling systems, and more particularly to a power adapter for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs such as, for example, portable IHSs, desktop IHSs, and/or a variety of other IHSs known in the art, use power adapters in order to convert alternating current (AC) power to direct current (DC) power for use in powering the IHS. In some of these power adapters, the DC ground contact can become elevated in voltage from the earth and this can cause some customers to feel a tingle sensation when touching the notebook. Although this tingle sensation poses no safety hazard, it raises significant customer satisfaction issues.

Conventionally, this problem is addressed by adding a 3-wire AC connection that includes an earth ground to the adapter. However, such connections must be approved by regulatory agencies, and due to safety concerns tend to result in a relatively large power adapters. Because it is sometimes desirable for the power adapters to be as small as possible, these 3-wire connections are often not included on the power adapters used with small form factor systems, resulting in the customer satisfaction issues discussed above.

Accordingly, it would be desirable to provide an improved power adapter absent the disadvantages discussed above.

SUMMARY

According to one embodiment, a power adapter, includes an adapter base defining a plug member channel immediately adjacent a first channel wall and a second channel wall that is oriented substantially perpendicular to the first channel wall, a power member connector that extends into the first channel wall such that no part of the power member connector protrudes into the defined plug member channel, a ground member connector located on the second channel wall and spaced apart from the power member channel; and a plug member including a plug base having a first plug wall and a second plug wall that is oriented substantially perpendicularly to the first plug wall, wherein a power member is located on the first plug wall and a ground member is located on the second plug wall, and wherein the plug member is operable to be inserted into the plug member channel such that the power member enters the power member channel and electrically couples to the power member connector and the ground member engages the ground member connector.

BRIEF DESCRIPTION OF THE DRAWINGS

FIG. 2b is an exploded view illustrating an embodiment of the adapter base of FIG. 2a.

FIG. 3b is an exploded view illustrating an embodiment of the plug member of FIG. 3a.

FIG. 3c is a cross-sectional view illustrating an embodiment of the plug member of FIG. 3a.

FIG. 3d is a cross-sectional view illustrating an embodiment of the plug member of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
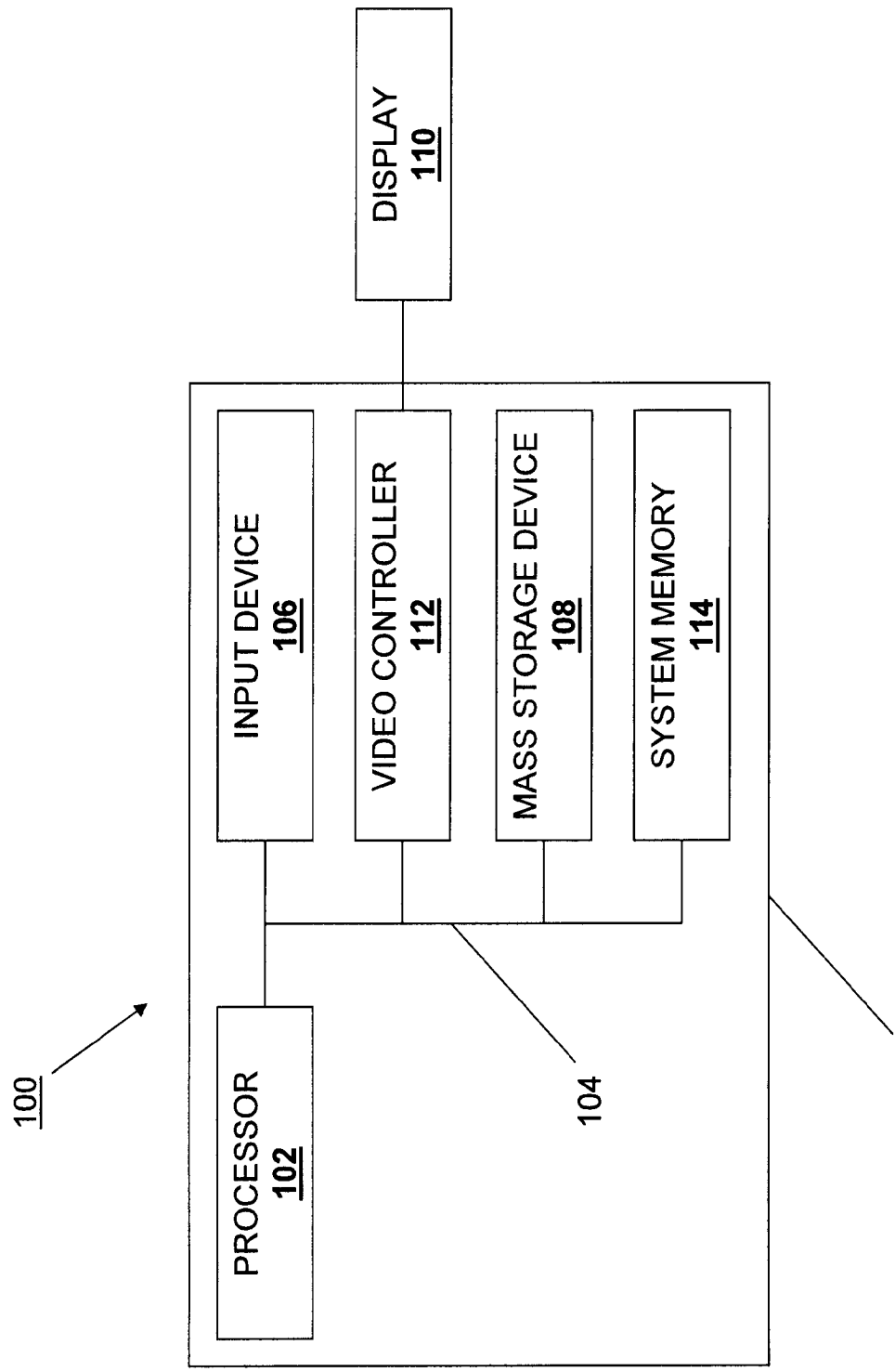
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
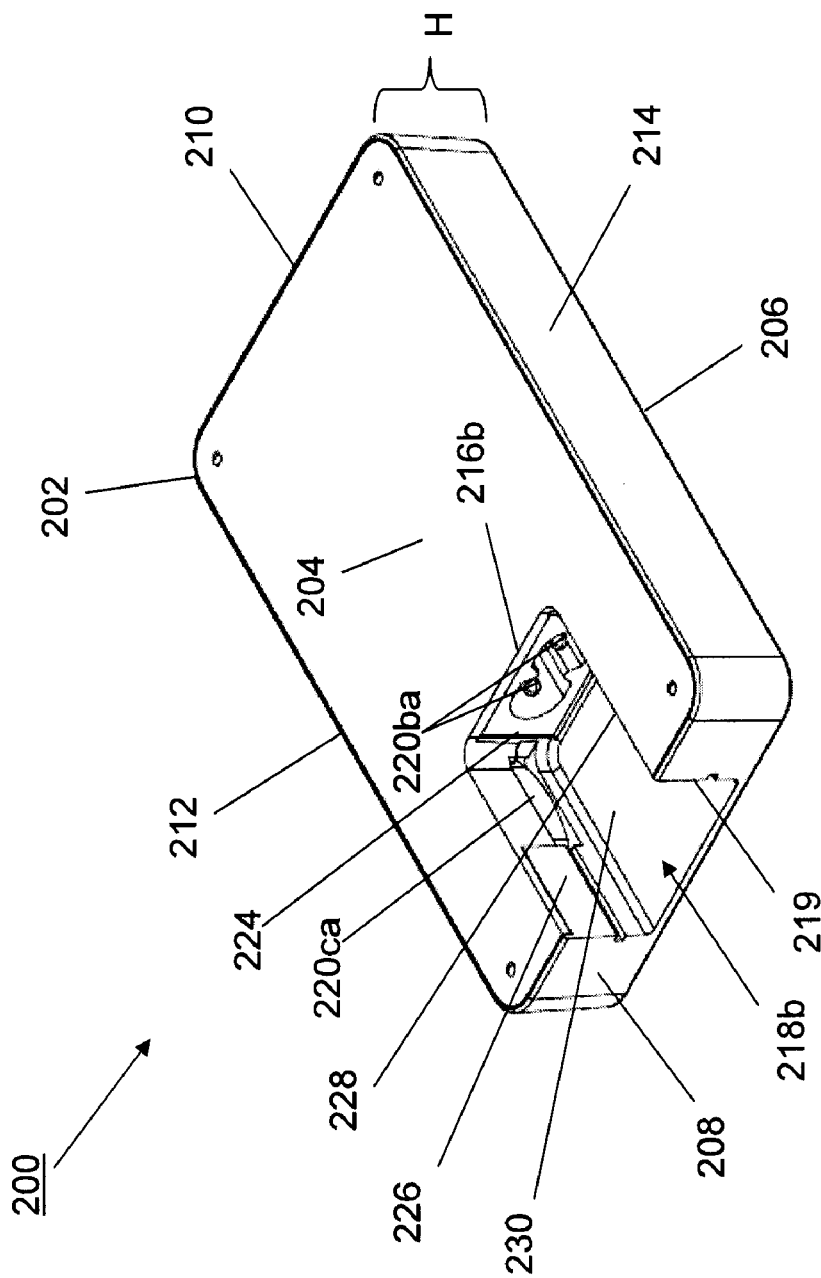
FIG. 2a is a perspective view illustrating an embodiment of an adapter base.
Figure 2B:
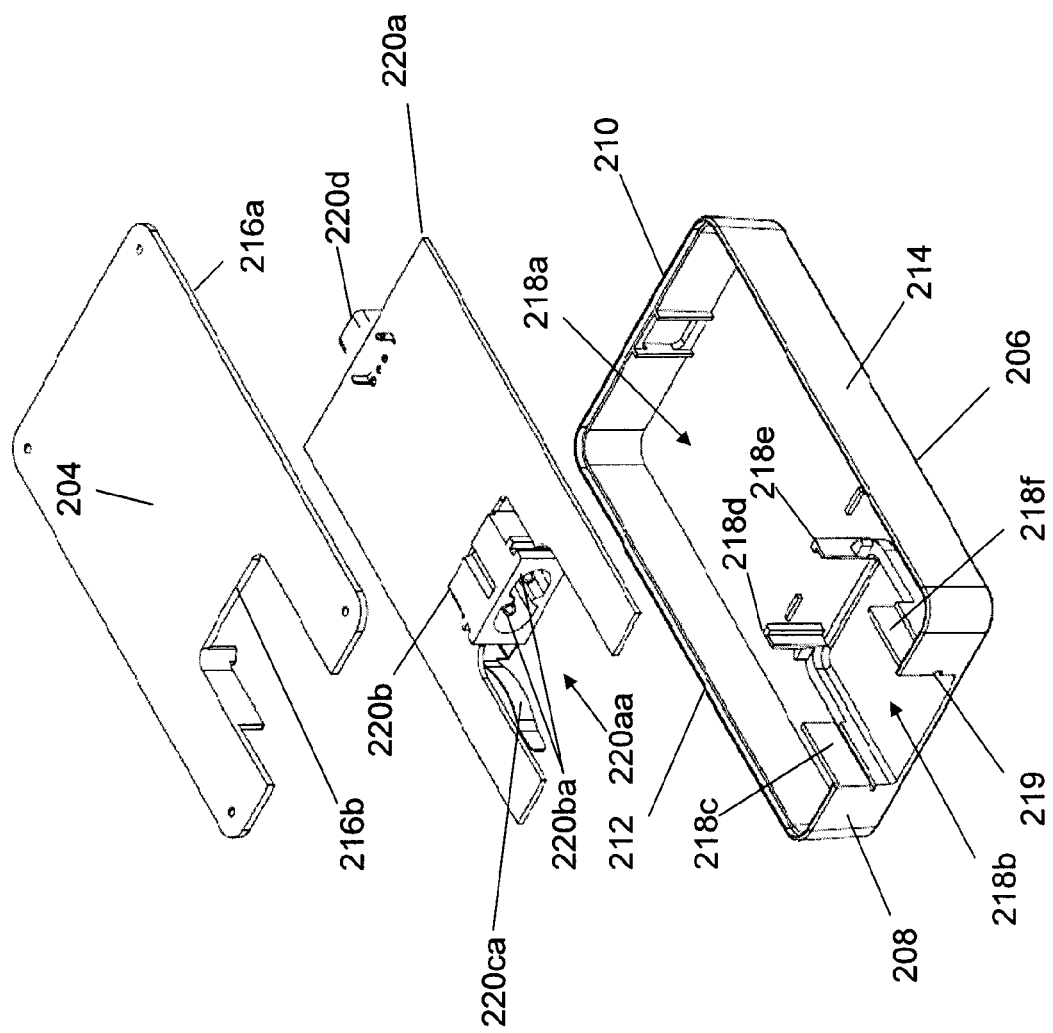
Figure 2C:
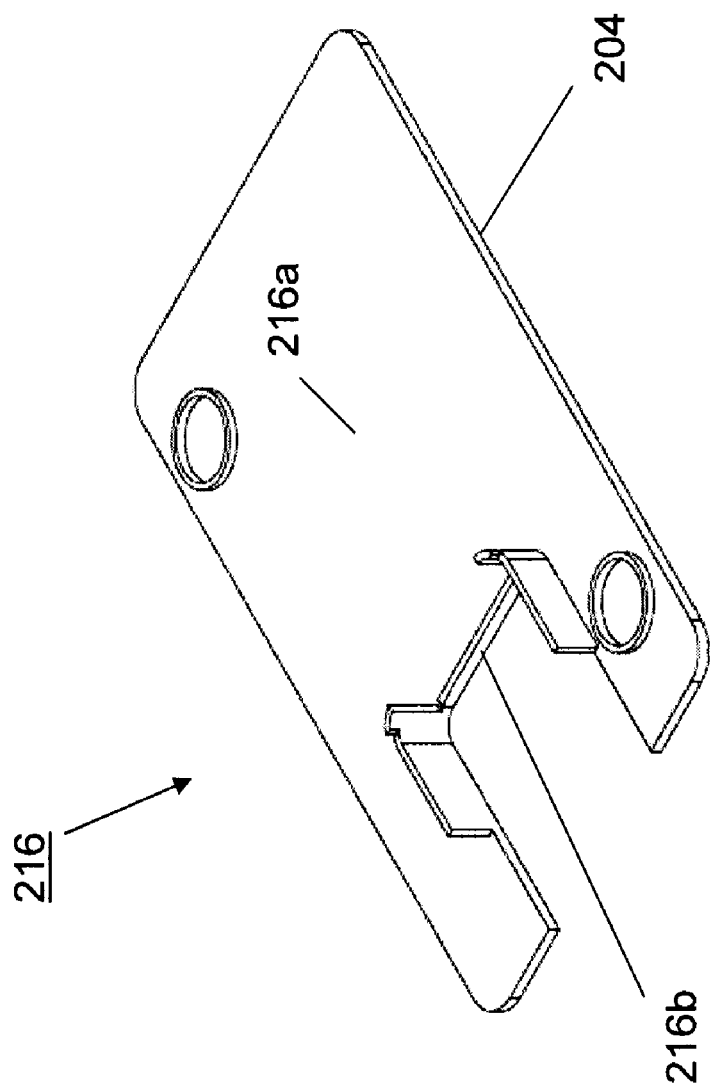
FIG. 2c is a perspective view illustrating an embodiment of a cover portion of the adapter base of FIGS. 2a and 2b.
Figure 2D:
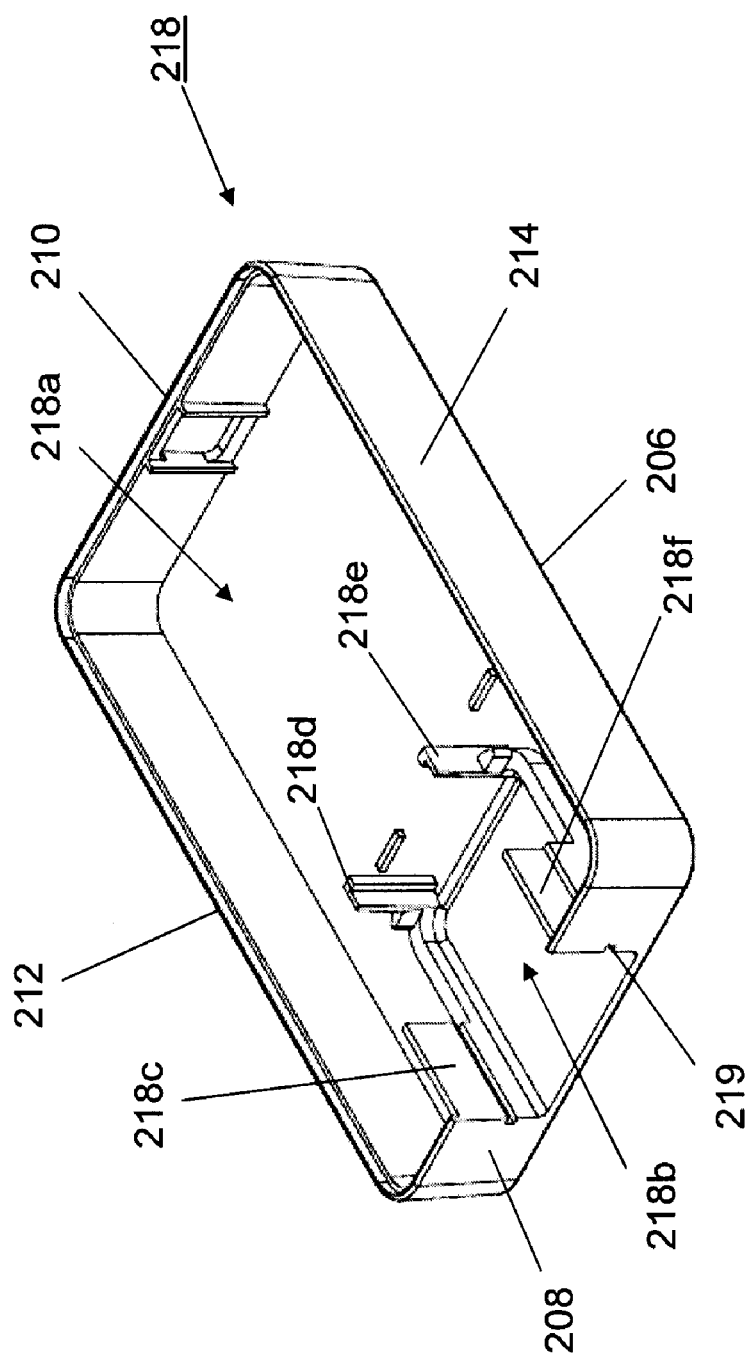
FIG. 2d is a perspective view illustrating an embodiment of a housing portion of the adapter base of FIGS. 2a and 2b.
Figure 2E:
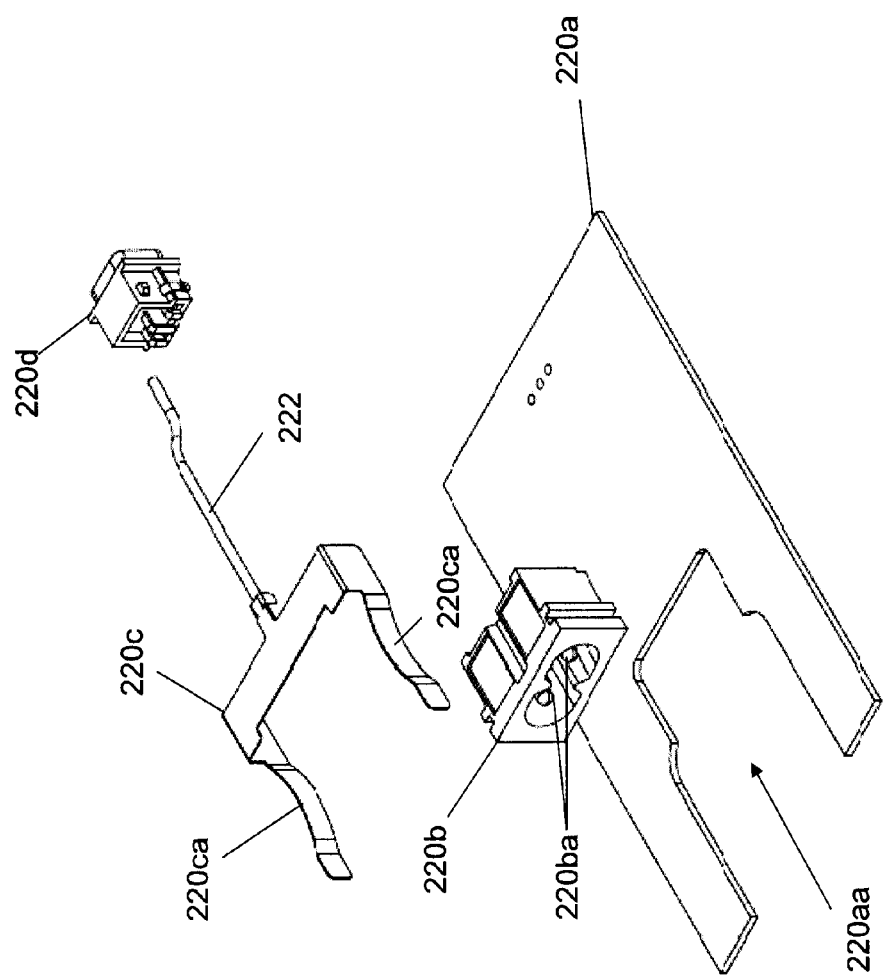
FIG. 2e is an exploded view illustrating an embodiment of a power transmitting portion of the adapter base of FIGS. 2a and 2b.
Figure 2F:
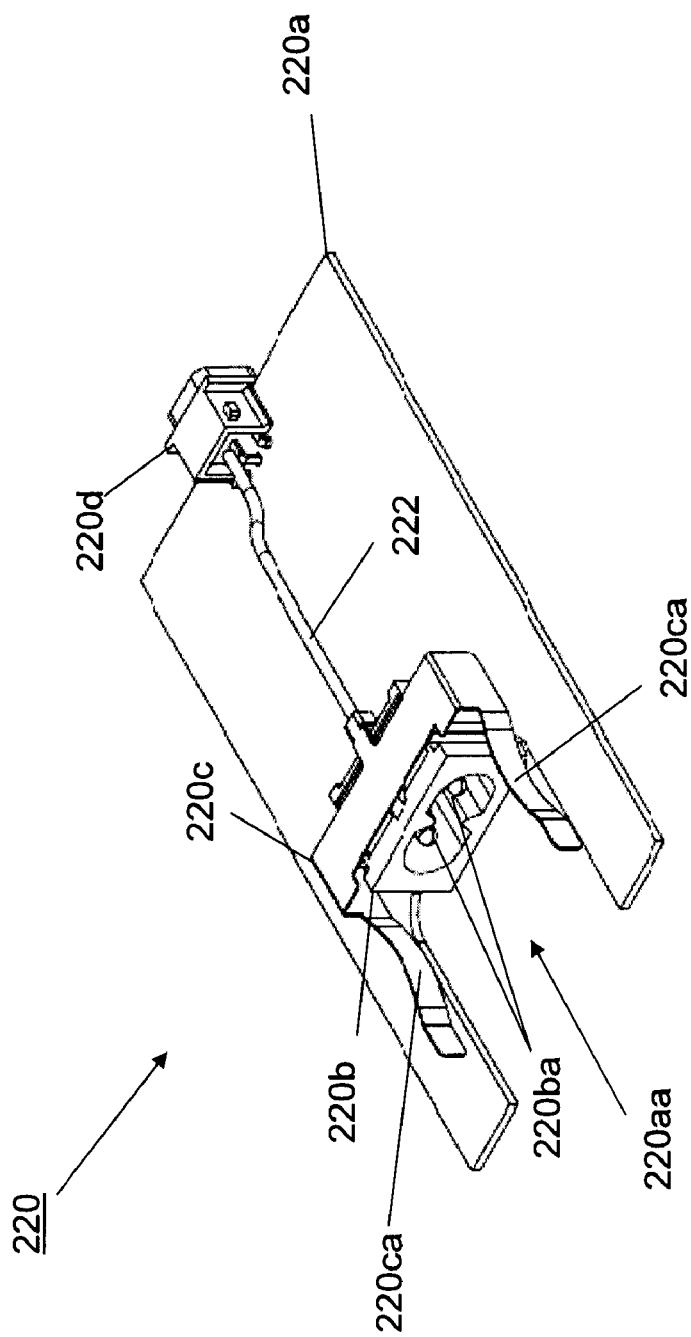
FIG. 2f is an perspective view illustrating an embodiment of the assembled power transmitting portion of FIG. 2e.
Figure 3A:
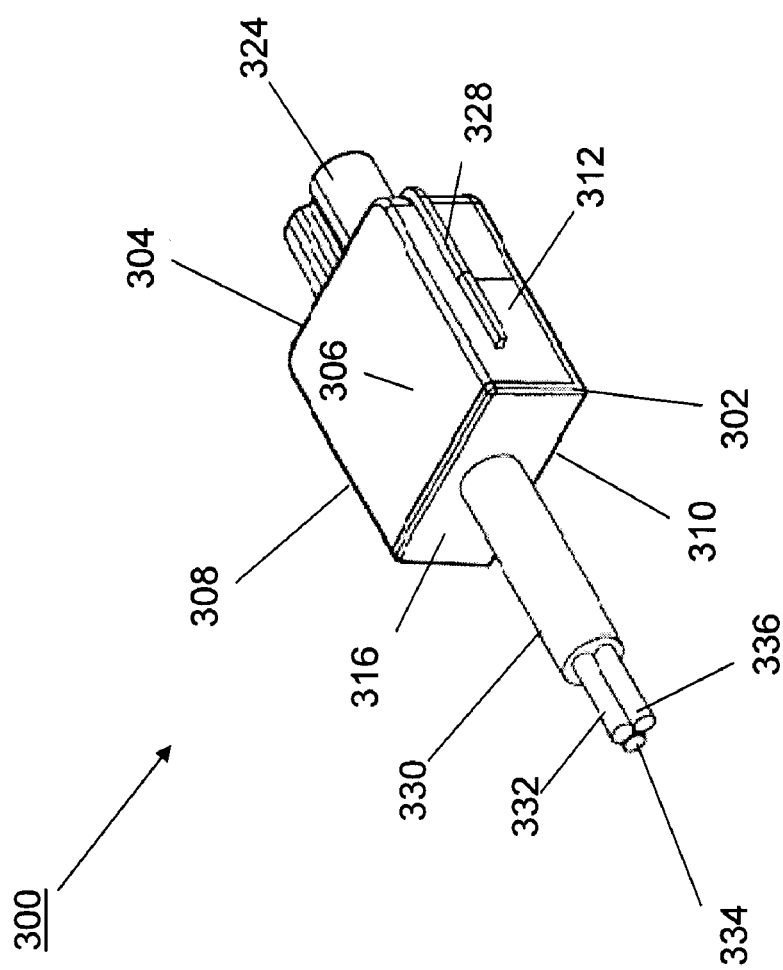
FIG. 3a is a perspective view illustrating an embodiment of a plug member used with the adapter base of FIGS. 2a, 2b, 2c, 2d, 2e and 2f.
Figure 3B:
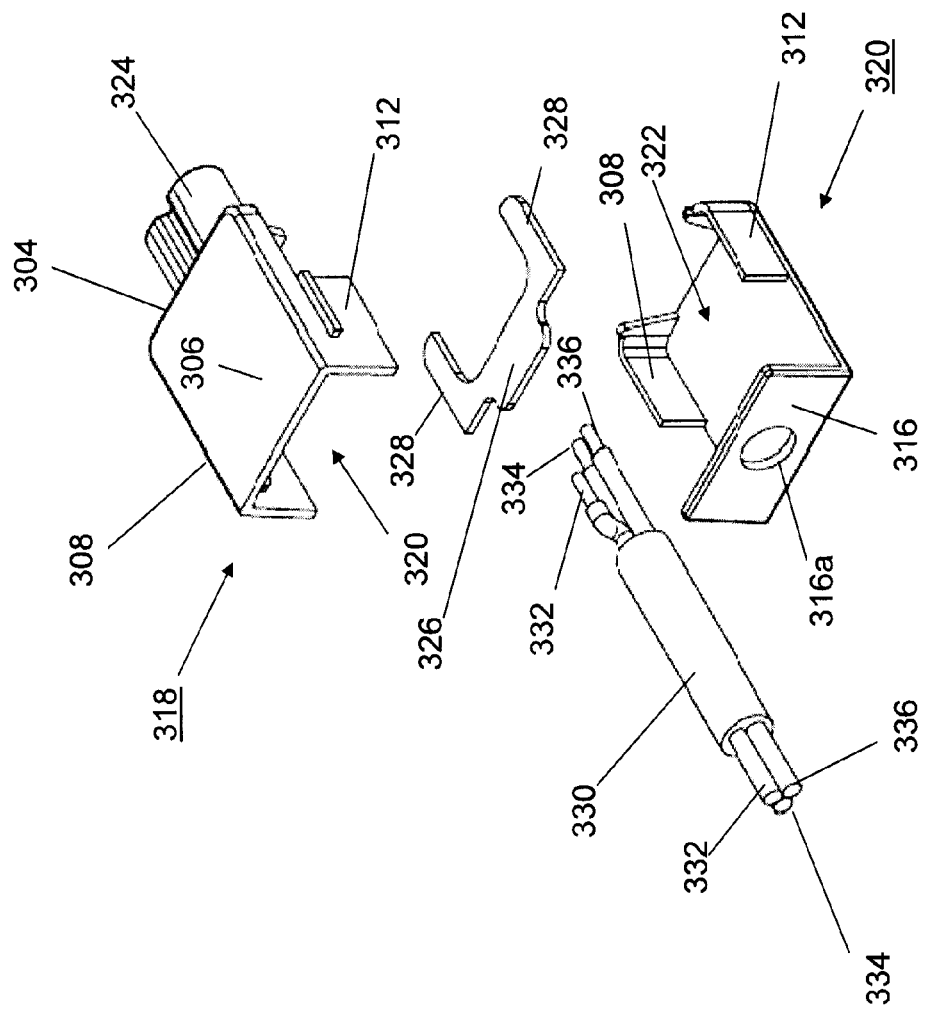
Figure 3C:
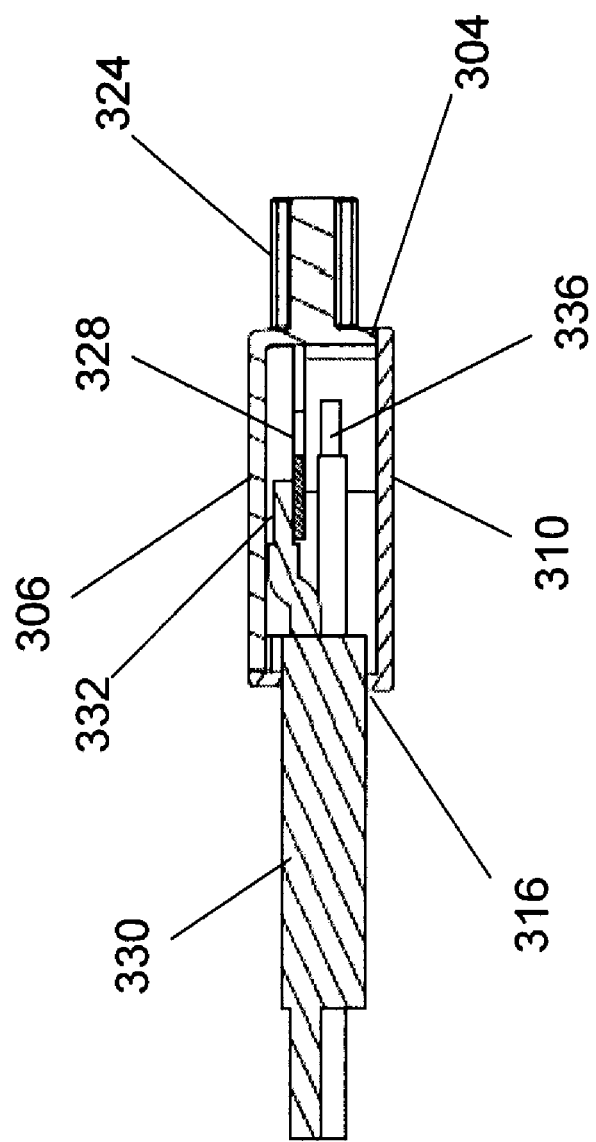
Figure 3D:
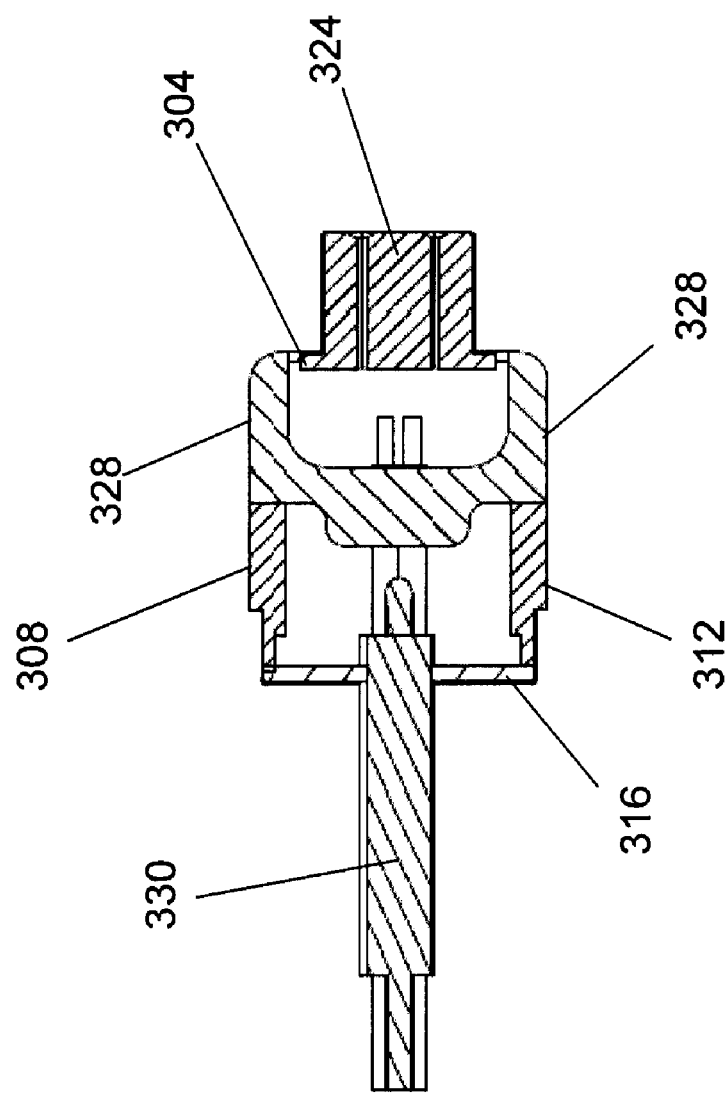

Referring now to FIGS. 2a, 2b, 2c, 2d, 2e and 2f, a power adapter 200 is illustrated. The power adapter 200 includes an adapter base 202 having a top surface 204, a bottom surface 206 located opposite the top surface 204, a front surface 208 extending between the top surface 204 and the bottom surface 206, a rear surface 210 that is located opposite the front surface 208 and extends between the top surface 204 and the bottom surface 206, and a pair of opposing side surfaces 212 and 214 that extend between the top surface 204, the bottom surface 206, the front surface 208, and the rear surface 210. As illustrated in FIGS. 2a, 2b and 2c, the adapter base 202 includes a cover portion 216 that includes the top surface 204 and a cover portion bottom surface 216a that is located opposite the top surface 204. A plug member access 216b is defined by the cover portion 216 and extends into the cover portion 216 from a side of the cover portion 216a. As illustrated in FIGS. 2a, 2b and 2d, the adapter base 202 also includes a housing portion 218 that includes the bottom surface 206, the front surface 208, the rear surface 210, and the side surfaces 212 and 214. The housing portion 218 defines a housing 218a located between the bottom surface 206, the front surface 208, the rear surface 210, and the side surfaces 212 and 214. The housing portion 218 also defines a plug member channel 218b between a plurality of channel features 218c, 218d, 218e and 218f. The plug member channel 218b extends into the housing 218a on the housing portion 218 and includes a plug member entrance 219 located adjacent the front surface 208 of the housing portion 218. As illustrated in FIGS. 2a, 2b, 2e and 2f, the adapter base 202 also includes a power transmitting portion 220 that includes a support member 220a, a power member connector base 220b, a ground member connector base 220c, and a cord coupler 220d. The support member 220a defines a support member channel 220aa that extends into the support member 220a from a side of the support member 220a. The power member connector base 220b houses a power member connector 220ba. In the illustrated embodiment, the power member connector 220ba is a two-pin power member connector. The ground member connector base 220c includes a ground member connector 220ca extending from opposing ends of the ground member connector base 220c. As illustrated in FIGS. 2e and 2f, upon assembly, the power transmitting portion 220 includes the power member connector base 220b coupled to the support member 220a and located in the support member channel 220aa, the ground member connector base 220c coupled to the power member connector base 220b such that the ground member connectors 220ca extend on either side of the support member channel 220aa, the cord coupler 220d coupled to the support member 220a along an edge of the support member 220a, and a coupling 222 that couples the power member connectors 220ba and/or the ground member connectors 220ca to the cord coupler 220d. In an embodiment, the coupler 222 includes a double insulated wire that traverses from an AC to DC side of the adapter to connect the earth ground to the negative DC terminal of the adapters DC out connector. In an embodiment, this ground may be designated a functional safety ground that does not need to be designed to carry large currents for safety certification. As illustrated in FIGS. 2a and 2b, upon assembly, the adapter base 202 includes the power transmitting portion 220 located in the housing 218a and between the housing portion 218 and the cover portion 216. With the adapter base 202 assembled, the plug member channel 218b is defined by the adapter base 202 between a first channel wall 224 and a plurality of second channel walls 226, 228 and 230 that are oriented substantially perpendicularly to the first channel wall 224, with the power member connector 220ba located on the first channel wall 224 and the ground member connectors 220ca located on the second channel walls 226 and 228. In an embodiment, it is desirable that a height H of the adapter base 202 be minimized in order to provide a small form factor for the adapter base 202, and the positioning of the ground member connectors 220ca on the second channel walls 226 and 228 provides a grounded power connection that reduces the height H of the adapter base 202 relative to conventional power connectors while isolating the ground member connectors 220ca from the power member connectors 220ba to alleviate possible safety concerns.

Referring now to FIGS. 3a, 3b, 3c and 3d, a plug member 300 is illustrated. The plug member 300 includes a plug base 302 having a first plug wall 304 and a plurality of second plug walls 306, 308, 310 and 312 that extend from the first plug wall 304 and that are oriented substantially perpendicularly to the first plug wall 304. A rear plug wall 316 is located opposite the plug base 302 from the first plug wall 304, extends between the plurality of second plug walls 306, 308, 310 and 312, and defines a power cord aperture 316a. The plug base 302 includes an upper portion 318 and lower portion 320 that define a housing 322 between them. A power member 324 extends from the first plug wall 304. In an embodiment, the power member is a two-pin power member. A ground member base 326 is housed in the housing 322 and includes a plurality of ground members 328 that extend from the housing 322 and out of the plug base 302 such that the ground members 328 are located on the second plugs walls 308 and 312. A power cord 330 extends through the power cord aperture 316a and into the housing 322 and includes a plurality of electrical couplers 332, 334 and 336. The electrical coupler 332 is coupled to the ground member base 326 and the electrical couplers 334 and 336 are coupled to the power member 324.

Figure 4A:
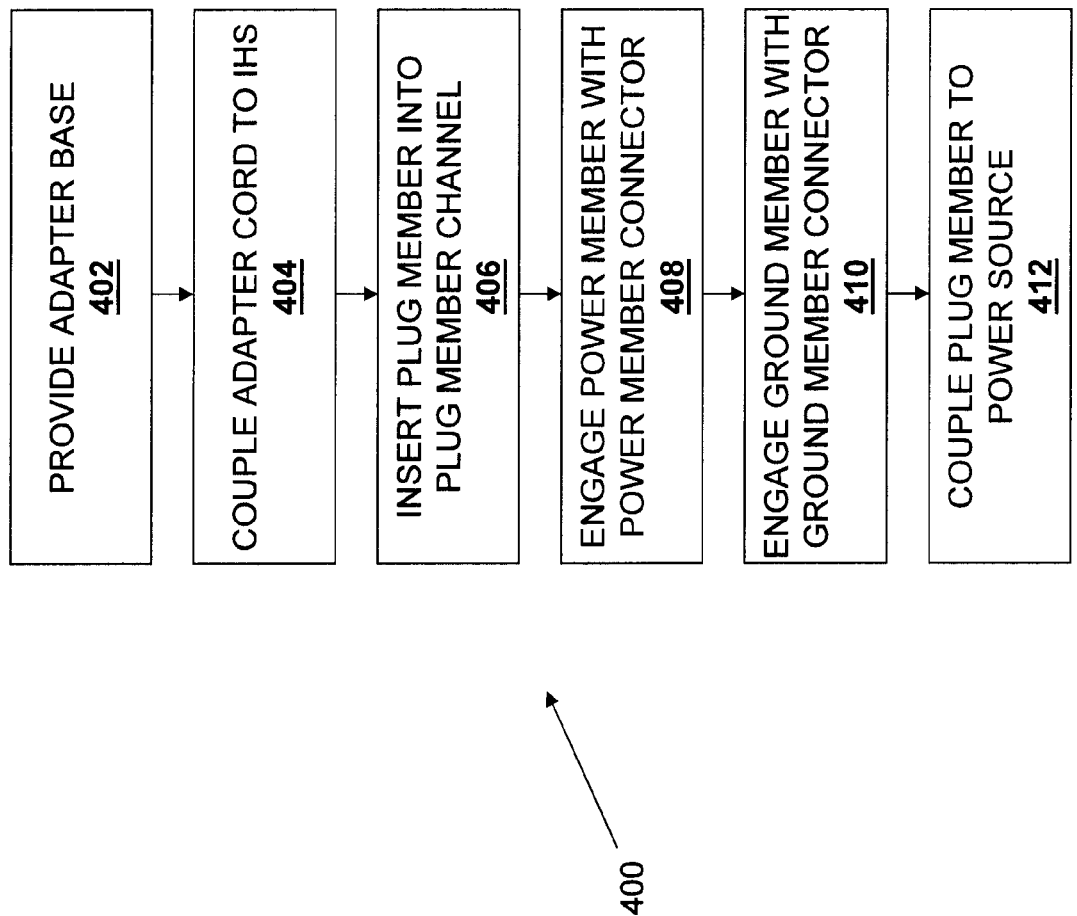
FIG. 4a is a flow chart illustrating an embodiment of a method for powering an IHS.
Figure 4B:
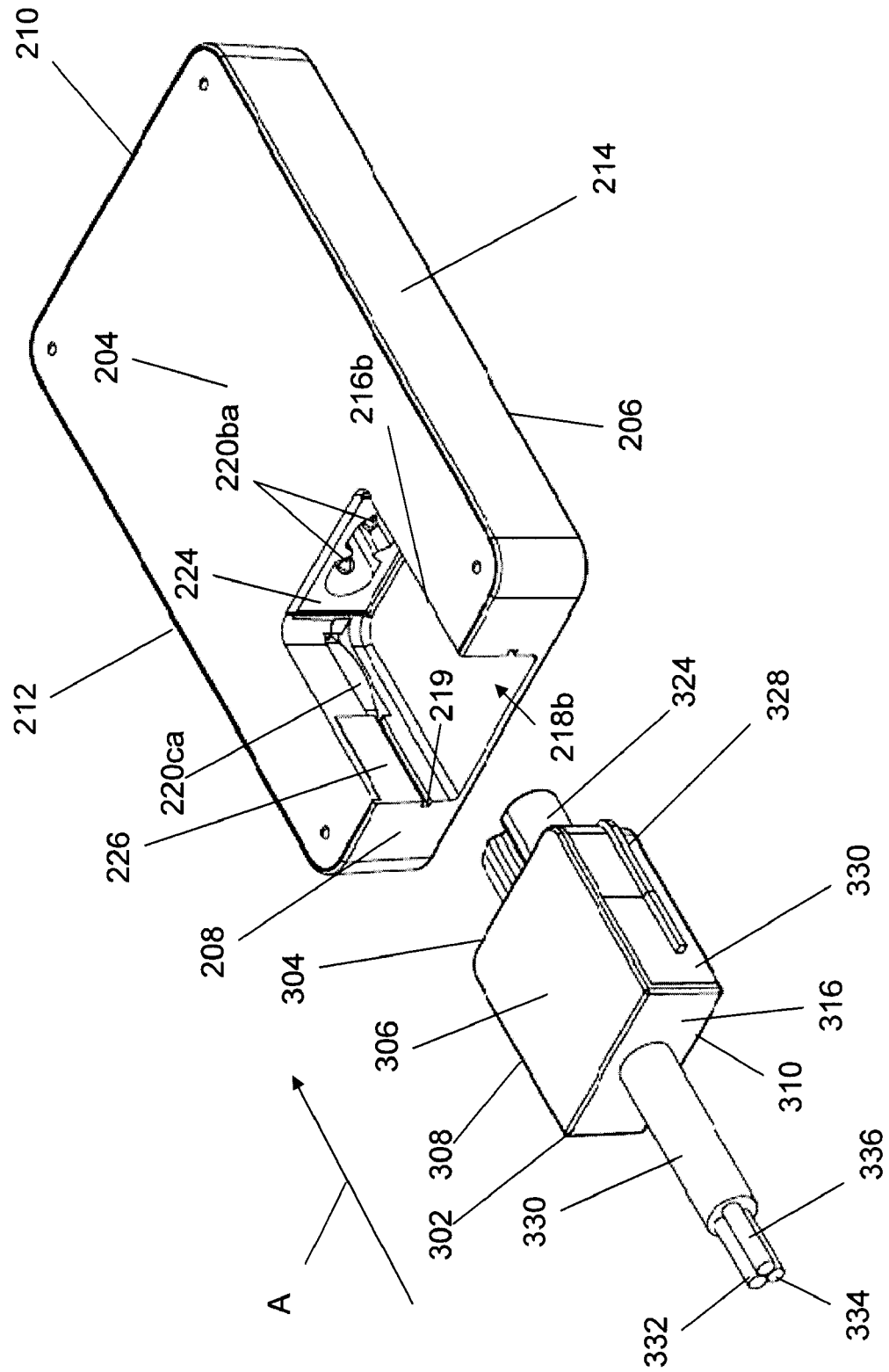
FIG. 4b is a perspective view illustrating an embodiment of the plug member of FIGS. 3a, 3b, 3c and 3d being coupled to the adapter base of FIGS. 2a, 2b, 2c, 2d, 2e and 2f.
Figure 4C:
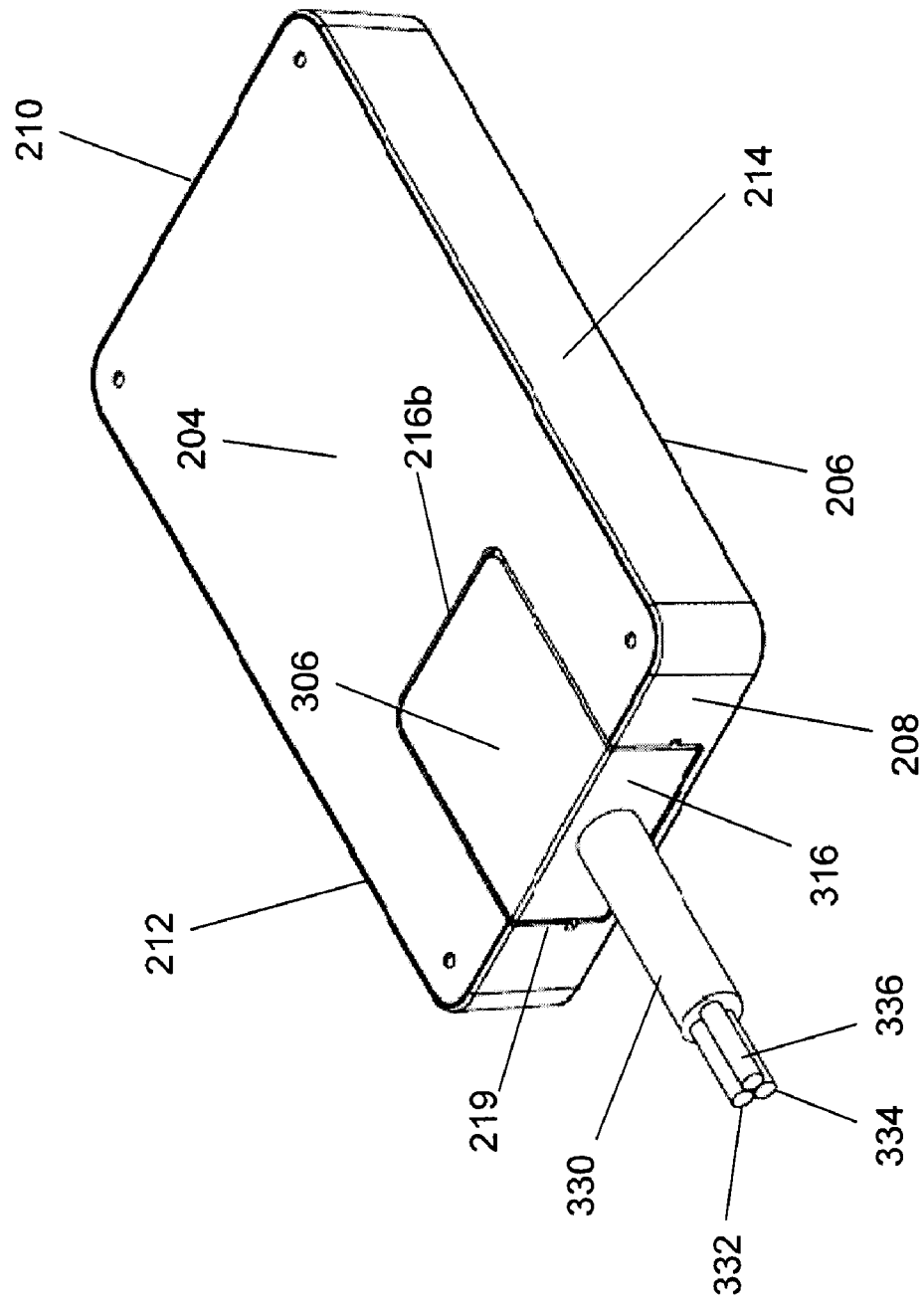
FIG. 4c is a perspective view illustrating an embodiment of the plug member of FIGS. 3a, 3b, 3c and 3d coupled to the adapter base of FIGS. 2a, 2b, 2c, 2d, 2e and 2f.
Figure 4D:
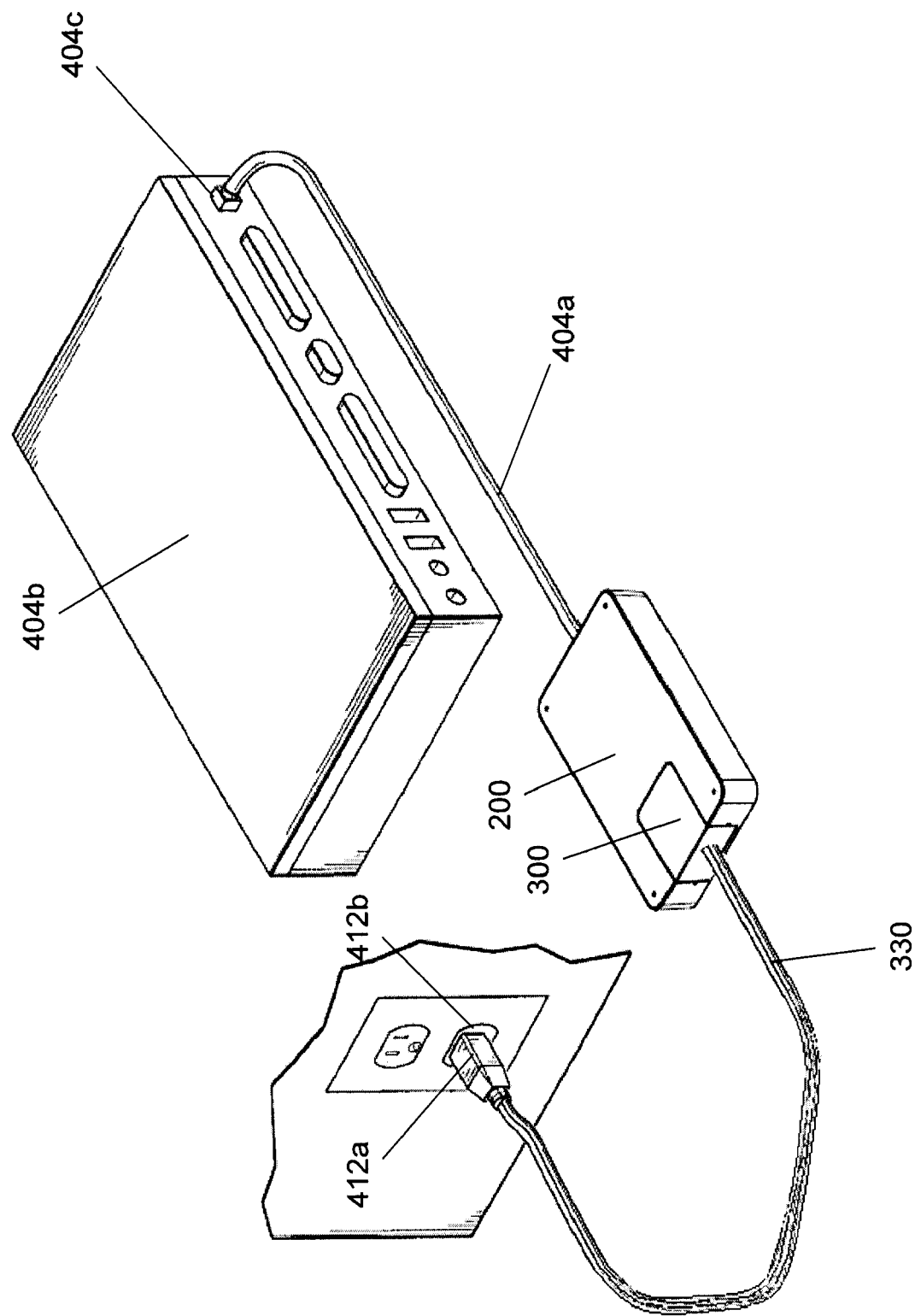
FIG. 4d is a perspective view illustrating an embodiment of the plug member and the adapter base of FIG. 4c coupling an IHS to a power source.

Referring now to FIGS. 2a, 3a, 4a, 4b, 4c and 4d, a method 400 for providing power to an IHS is illustrated. The method 400 begins at block 402 where an adapter base is provided. The adapter base 202, described above with reference to FIGS. 2a, 2b, 2c, 2d, 2e and 2f, is provided. The method 400 then proceeds to block 404 where an adapter cord is coupled to an IHS. In an embodiment, an adapter cord 404a may be detachably or permanently connected to the cord coupling 220d on the adapter base 202, and that adapter cord 404a may be coupled to an IHS 404b that houses a plurality of powered components that are coupled to an adapter connector 404c, as illustrated in FIG. 4d. In an embodiment, the IHS 404b may be, for example, the IHS 100, described above with reference to FIG. 1. The method 400 then proceeds to block 406 where a plug member is inserted into the plug member channel. The plug base 302 is positioned adjacent the adapter base 202 such that the power member 324 is adjacent the plug member channel 218b, as illustrated in FIG. 4b. The plug base 302 may then moved in a direction A such that the plug base 302 enters the plug member channel 218b through the plug member entrance 219. In another embodiment, the plug base 302 may enter the plug member channel 218b through the plug member access 216b. The method 400 then proceeds to blocks 408 and 410 where the power member is engaged with the power member connector and the ground member is engaged with the ground member connector. Continued movement of the plug base 302 in the direction A will cause the power member 324 to engage the power member connectors 220b and the ground members 328 to engage the ground member connectors 220ca, and the plug base 302 may be moved in the direction A until the plug base 302 is completely located in the plug member channel 218b, as illustrated in FIG. 4c, such that the ground member connectors 220ca are fully engaging the ground members 328 and the power member connectors 220b are coupled to the electrical couplers 334 and 336 through the power member 324. The method 400 then proceeds to block 412 where the plug member is coupled to a power source. In an embodiment, the power cord 330 extending from the plug member 300 may include a connector 412a such as, for example, a three-pin Alternating Current (AC) connector, located on a distal end of the power cord 330 opposite the plug base 302, and that connector 412a may be coupled to a power source through an outlet 412b or other method known in the art, as illustrated in FIG. 4d, in order to provide power to the IHS 404b. In the embodiment illustrated in FIG. 4d, the plug member 300 provides the power connection from the outlet 412b, through the adapter 202, and to the IHS 404b through the coupling of the power member 324 and the power member connectors 220b, and also provides the ground connection from the outlet 412b, through the adapter 202, and to the IHS 404b through the coupling of the ground members 328 and the ground member connectors 220ca in order to provide a grounded power supply to the IHS 404b. Thus, a power adapter is provided that provides a grounded power supply to an IHS while achieving a low profile form factor. Furthermore, the power adapter is compatible with a plug member that includes a two-wire AC cord and has no grounding connection.

Figure 5A:
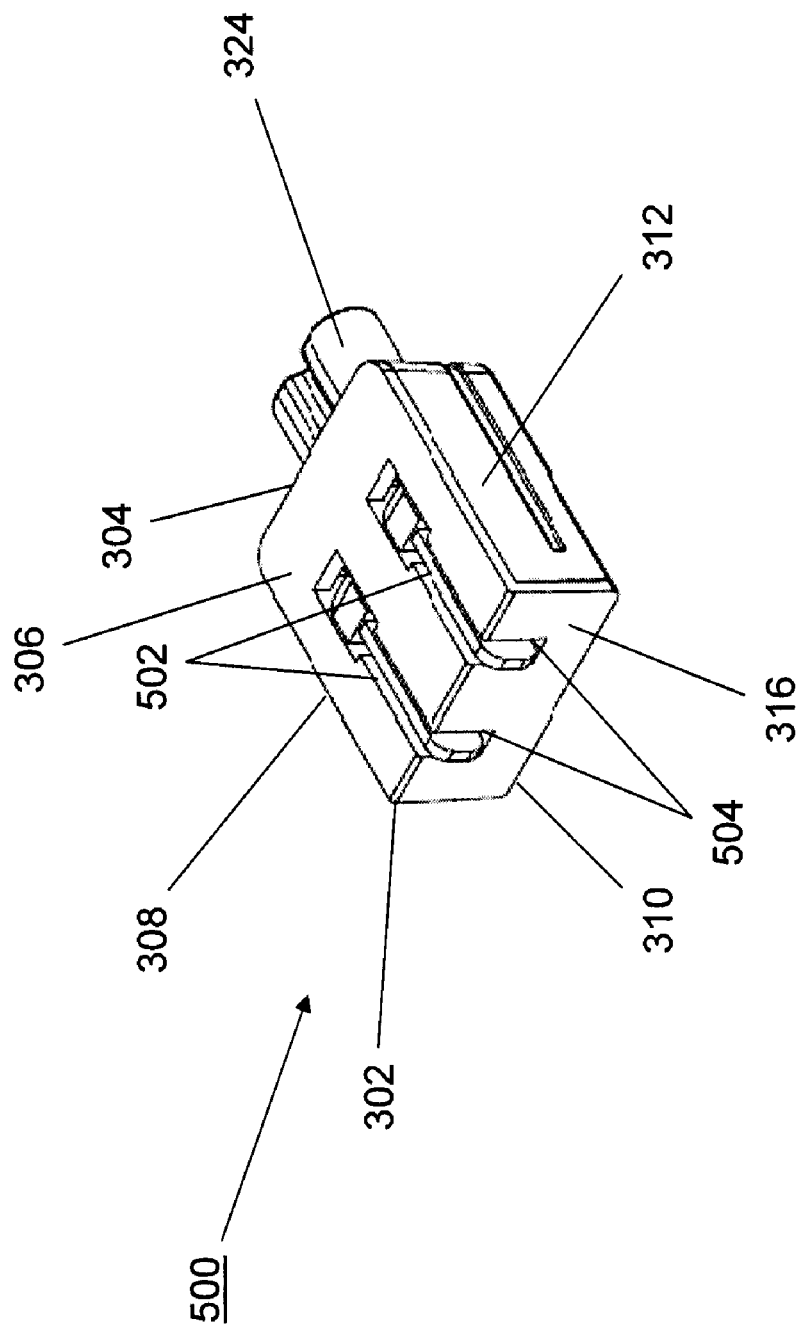
FIG. 5a is a perspective view illustrating an embodiment of a plug member.
Figure 5B:
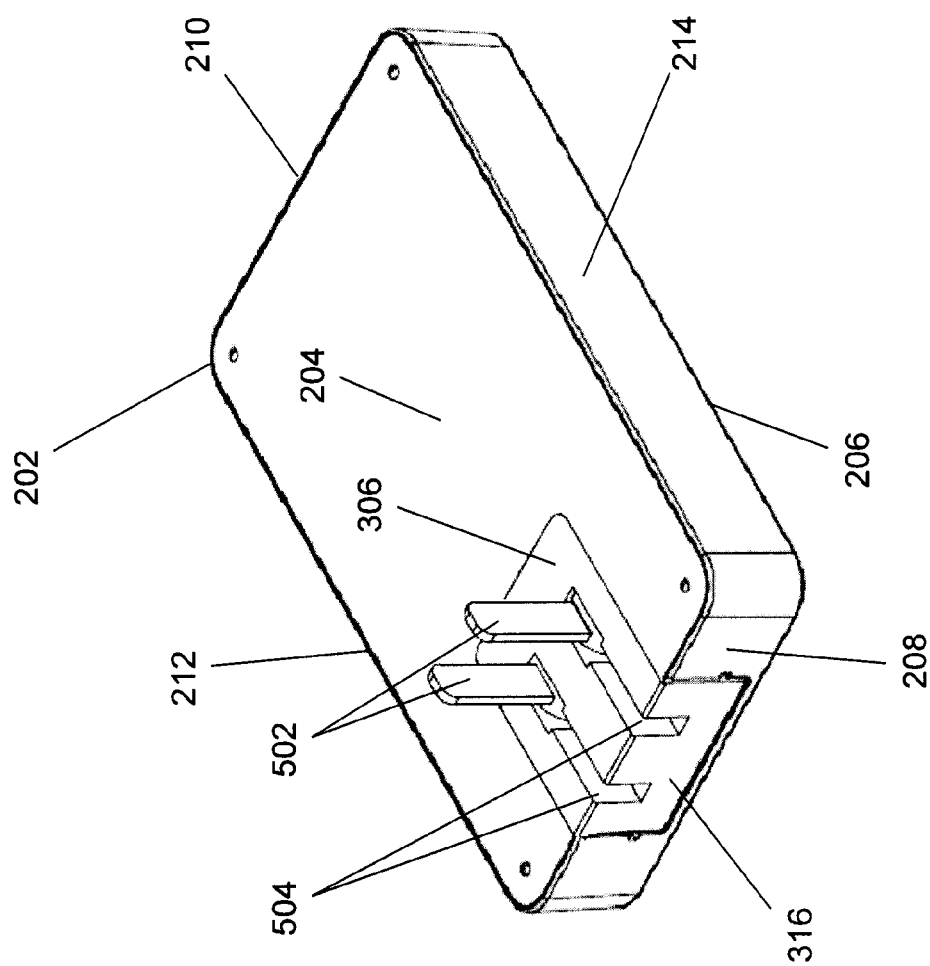
FIG. 5b is a perspective view illustrating an embodiment of the plug member of FIG. 5a coupled to the adapter base of FIGS. 2a, 2b, 2c, 2d, 2e and 2f.

Referring now to FIGS. 5a and 5b, a plug member 500 is illustrated that is substantially similar in structure and operation to the plug member 300 described above with reference to FIGS. 3a, 3b, 3c and 3d, but with the power cord 330 removed and the provision of a plurality of electrical couplers 502 that are each moveably coupled to the plug base 302 and may be each be located in a first position in a electrical coupler channel 504 that is defined by the plug base 302 and extends into the plug base 302 from the second channel wall 306 and the rear channel wall 316 such that the electrical couplers 502 are flush with the second channel wall 306, as illustrated in FIG. 5a. The plug member 500 may be coupled to the adapter base 202 in substantially the same manner as described above for the plug member 300 according to the method 400, with the exception of a modified block 412, where the electrical couplers 502 are moved from the first position illustrated in FIG. 5a to a second position where the electrical couplers 502 extend from the second channel wall 306, illustrated in FIG. 5b. The electrical couplers 502 may then be directly coupled to the outlet 412b. In an embodiment, the plug member 500 may be used when there is no need for a ground connection from the outlet 412b to the IHS 404b.

Figure 6A:
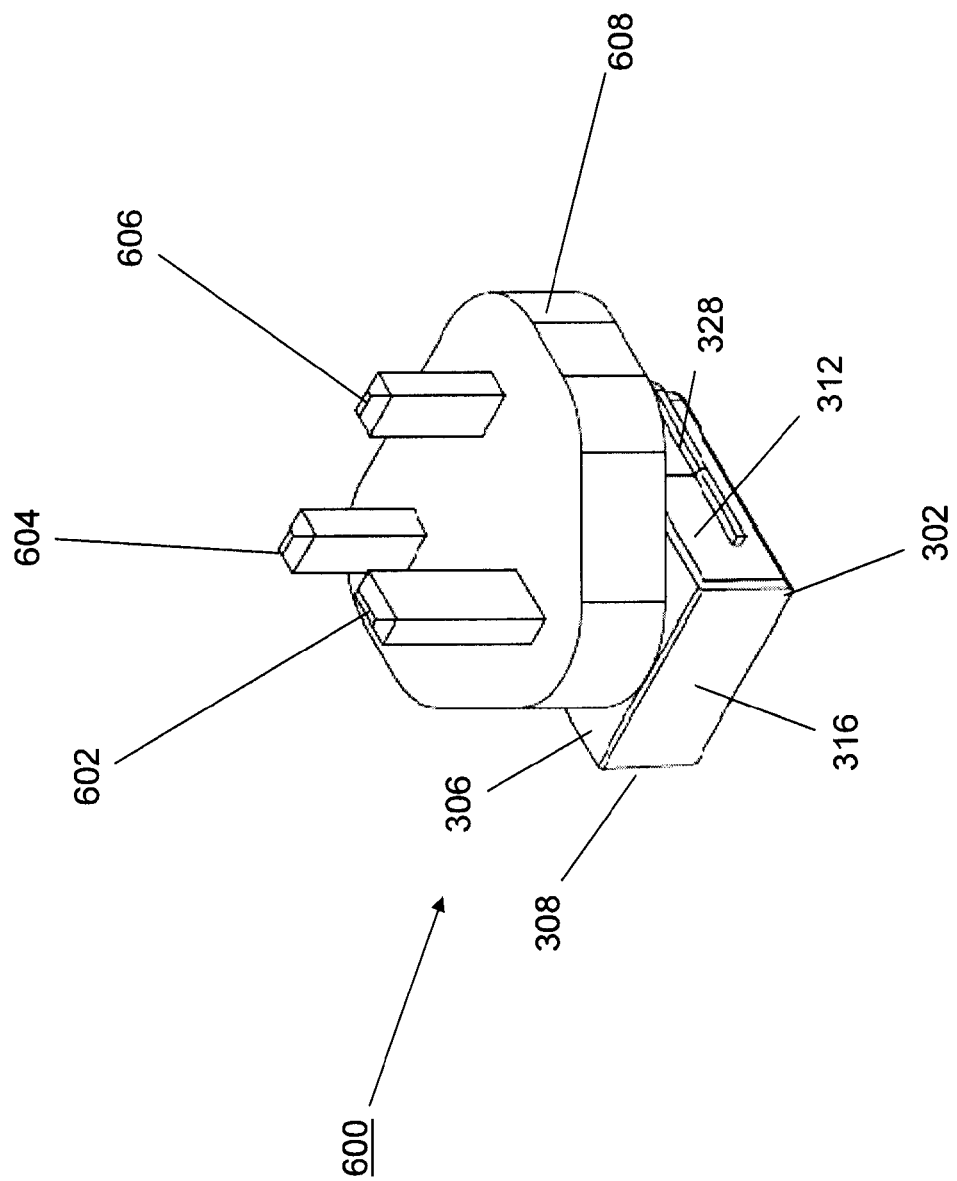
FIG. 6a is a perspective view illustrating an embodiment of a plug member.
Figure 6B:
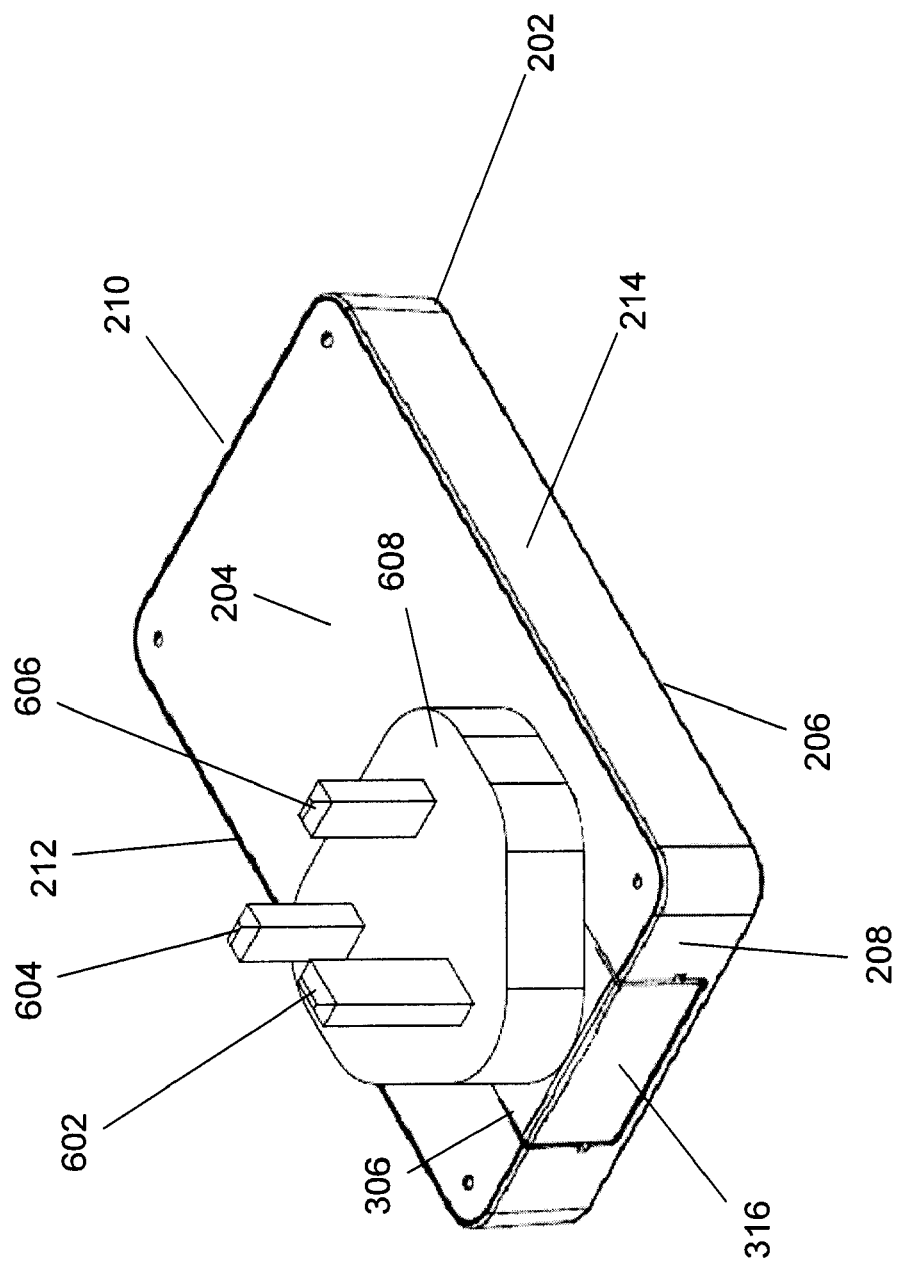
FIG. 6b is a perspective view illustrating an embodiment of the plug member of FIG. 6a coupled to the adapter base of FIGS. 2a, 2b, 2c, 2d, 2e and 2f.

Referring now to FIGS. 6a and 6b, a plug member 600 is illustrated that is substantially similar in structure and operation to the plug member 300 described above with reference to FIGS. 3a, 3b, 3c and 3d, but with the power cord 330 removed and the provision of a plurality of electrical couplers 602, 604 and 606 that extend from a support structure 608 that is coupled to the second plug wall 306 on the plug base 302. In an embodiment, the electrical coupler 602 is a ground coupler that is coupled to the ground members 328 and the electrical couplers 604 and 606 are power couplers that are coupled to the power member 328. The plug member 600 may be coupled to the adapter base 202 in substantially the same manner as described above for the plug member 300 according to the method 400, with the exception of a modified block 412, where the electrical couplers 602, 604 and 606 are directly coupled to the outlet 412b. While the support structure 608 and electrical couplers 602, 604 and 606 have been illustrated as a United Kingdom (UK) plug adapter, one of skill in the art will recognize that they may be modified to include any three-pin AC connector known in the art.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power adapter, comprising:
   an adapter base defining a plug member channel immediately adjacent a first channel wall and a second channel wall that is oriented substantially perpendicular to the first channel wall;
   a power member connector that extends into the first channel wall such that no part of the power member connector protrudes into the defined plug member channel;
   a ground member connector located on the second channel wall and spaced apart from the power member channel; and
   a plug member comprising a plug base having a first plug wall and a second plug wall that is oriented substantially perpendicularly to the first plug wall, wherein a power member is located on the first plug wall and a ground member is located on the second plug wall, and wherein the plug member is operable to be inserted into the plug member channel such that the power member enters the power member channel and electrically couples to the power member connector and the ground member engages the ground member connector.

2. The power adapter of claim 1, wherein the power member is a two-pin power member, and the power member connector is a two-pin power member connector.

3. The power adapter of claim 1, wherein an adapter cord extends from the adapter base and includes an adapter connector that is operable to couple to an information handling system (IHS).

4. The power adapter of claim 1, wherein the plug member includes a power cord having a three-pin Alternating Current (AC) connector coupled to the power cord opposite the plug member.

5. The power adapter of claim 1, wherein the plug member includes a two-pin AC connector located adjacent a third plug wall on the plug base.

6. The power adapter of claim 5, wherein the two-pin AC connector comprises a folding AC connector that is operable to be oriented into a first position such that the two-pin AC connector extends from the third plug wall, and a second position such that the two-pin AC connector is substantially flush with the third plug wall.

7. The power adapter of claim 1, wherein the plug member includes a three-pin AC connector located on a third plug wall on the plug base.

8. The power adapter of claim 1, wherein the adapter base includes a plurality of surfaces each defining a plug member entrance that allows the plug member to enter the plug member channel.

9. A power adapter, comprising:
an adapter base defining a plug member channel immediately adjacent a first channel wall and a second channel wall that is oriented substantially perpendicular to the first channel wall;
a power member connector that extends into the first channel wall such that no part of the power member connector protrudes into the defined plug member channel;
a ground member connector located on the second channel wall and spaced apart from the power member channel; and
a plug member comprising a plug base having a first plug wall and a second plug wall that is oriented substantially perpendicularly to the first plug wall, wherein a power member is located on the first plug wall and operable to be inserted into the plug member channel such that the power member enters the power member channel and electrically couples to the power member connector.

10. The system of claim 9, wherein the power member is a two-pin power member, and the power member connector is a two-pin power member connector.

11. The system of claim 9, wherein the plug member includes a ground member that is located on the second plug wall and operable to engage the ground member connector when the plug member is inserted into the plug member channel.

12. The system of claim 10, wherein the plug member includes a power cord having a three-pin Alternating Current (AC) connector coupled to the power cord opposite the plug member.

13. The system of claim 10, wherein the plug member includes a three-pin AC connector located on a third plug wall on the plug base.

14. The system of claim 9, wherein the plug member includes a two-pin AC connector located adjacent a third plug wall on the plug base.

15. The system of claim 13, wherein the two-pin AC connector comprises a folding AC connector that is operable to be oriented into a first position such that the two-pin AC connector extends from the third plug wall, and a second position such that the two-pin AC connector is substantially flush with the third plug wall.

16. The system of claim 9, wherein the adapter base includes a plurality of surfaces each defining a plug member entrance that allows the plug member to enter the plug member channel.

17. A method for providing power to an information handling system (IHS), comprising:
providing an adapter base that defines a plug member channel between a first channel wall and a second channel wall that is oriented substantially perpendicular to the first channel wall;
coupling an adapter cord that extends from the adapter base to an IHS;
inserting a plug member in the plug member channel, the plug member comprising a plug base having a first plug wall and a second plug wall that is oriented substantially perpendicular to the first plug wall, wherein a power member is located on the first plug wall and a ground member is located on the second plug wall;
inserting the power member into the first channel wall in order to engage a power member connector, wherein the power member connector extends into the first channel wall such that no part of the power member connector protrudes into the defined plug member channel;
engaging the ground member with a ground member connector that is located on the second channel wall and is spaced apart from the power member channel; and
coupling the plug member to a power source to provide power to the IHS.

18. The method of claim 17, wherein the coupling the plug member to a power source comprises coupling a two-pin Alternating Current (AC) connector, that is located on a third plug wall on the plug base, to a power source.

19. The method of claim 17, wherein the coupling the plug member to a power source comprises coupling a three-pin Alternating Current (AC) connector, that is located on a third plug wall on the plug base, to a power source.

20. The method of claim 17, wherein the coupling the plug member to a power source comprises coupling a three-pin Alternating Current (AC) connector, that is located on a power cord that extends from the plug member, to a power source.

* * * * *